US006891538B1

(12) United States Patent
Tannenbaum

(10) Patent No.: US 6,891,538 B1
(45) Date of Patent: May 10, 2005

(54) DUAL MODE DEVICE AND METHOD FOR GENERATING VECTOR CROSS PRODUCTS OR DOT PRODUCTS

(75) Inventor: David C. Tannenbaum, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/348,885

(22) Filed: Jul. 1, 1999

(51) Int. Cl.[7] .............................................. G06T 15/00
(52) U.S. Cl. ...................................................... 345/426
(58) Field of Search ................................ 708/520, 521, 708/522, 620, 621, 622; 345/426, 619

(56) References Cited

U.S. PATENT DOCUMENTS

| | | | | |
|---|---|---|---|---|
| 4,354,249 A | * | 10/1982 | King et al. ................. | 708/622 |
| 5,025,407 A | * | 6/1991 | Gulley et al. ............... | 708/514 |
| 5,061,866 A | * | 10/1991 | El-Naggar et al. .......... | 327/357 |
| 5,163,126 A | * | 11/1992 | Einkauf et al. ............. | 345/423 |
| 5,182,797 A | | 1/1993 | Liang et al. ................ | 395/160 |
| 5,187,796 A | * | 2/1993 | Wang et al. ................ | 708/520 |
| 5,526,471 A | | 6/1996 | Tannenbaum et al. ...... | 395/119 |
| 5,659,671 A | | 8/1997 | Tannenbaum et al. ...... | 395/126 |
| 6,557,022 B1 | * | 4/2003 | Sih et al. .................... | 708/523 |

OTHER PUBLICATIONS

Corral et al., Reduction of Matrix Products and their Error Bounds, IEEE Nov. 7, 2001, pp. 1295–1298.*
Foley, Computer Graphics: Principles and Practice, 1996, Addison–Wesley, $2^{nd}$ Edition, 722–732, 1104.*
Foley et al., "Computer Graphics Principles and Practice", $2^{nd}$ Ed. in C, 1997, p. 721–814.
Woo et al., "OpenGL Programming Guide", $2^{nd}$ Ed., Version 1.1, 1997, p. 169–211.

* cited by examiner

Primary Examiner—Phu K. Nguyen
(74) Attorney, Agent, or Firm—Woodcock Washburn LLP

(57) ABSTRACT

A dual mode device and method is provided for generating cross product or dot product from a pair of vectors. The dual mode device generates a cross product or a dot product from a first vector and a second vector. The first vector has a first set of components and the second vector has a second set of components. The device includes a dual mode controller and a dual mode unit. The dual mode controller receives the first and second vectors and is configured to select vector components for evaluating a cross product component or a dot product in response to a first signal. The first signal indicates whether to generate a cross product component or a dot product. The dual mode unit is coupled to receive the selected vector components and generates the cross product component or the dot product in response to the first signal.

17 Claims, 10 Drawing Sheets

DUAL MODE DEVICE AND METHOD FOR GENERATING VECTOR CROSS PRODUCTS OR DOT PRODUCTS

CROSS REFERENCE TO RELATED APPLICATIONS

This application is related to U.S. patent application Ser. No. 09/265,507 filed on the Mar. 9, 1999 and entitled "Method and Device for Generating Per-Pixel Values," by inventors David C. Tannenbaum et al. The application is incorporated herein by reference.

BACKGROUND OF THE INVENTION

The present invention relates to the field of devices for generating vector products and, more particularly, to devices for efficiently generating vector cross products and dot products in computer graphics systems.

Rendering of realistic images (e.g., two- or three-dimensional images) is one of the main goals of graphics system designers. Rendering images of real or imaginary objects typically involves generating geometric models (e.g., polygons) of the objects and applying lighting effects to the polygonal surfaces. In computer graphics, surfaces of an object are generally modeled by a polygonal mesh, which is a collection of vertices, edges, and/or polygons. A mesh of polygons may be produced from a variety of sources such as an application, tesselated NURBS surfaces, spheres, cones, etc. The vertices may be connected by edges and a sequence of edges or vertices may define one or more polygons.

Rendering of realistic 3D graphics requires accurate and efficient modeling of 3D surfaces based upon the position, orientation, and characteristics of the surfaces and the light sources illuminating them. In particular, the interaction between lights and surfaces must be modeled for rendering. To more accurately model lighting effects, conventional computer graphics systems have typically implemented shading techniques to generate light values at individual pixels using an illumination or lighting model.

Conventional lighting models typically model one or more lighting effects such as diffuse reflection, specular reflection, and spotlighting, each of which is typically determined by evaluating a dot product of two vectors. Diffuse reflection accounts for reflection of light from a surface, especially a dull, matte surface. The reflected light from the surface falls off approximately uniformly as a function of an angle between N and L, where N is the outward normal vector at a surface point and L is a light vector. The light vector L points in the direction from the surface point to the light source. The diffuse light fall-off in the diffuse reflection model is typically modeled by using a dot product term N●L.

Similarly, the specular reflection accounts for reflection of light off a shiny surface. When a light from a light source is reflected off a shiny surface, the reflected light is modeled as falling off exponentially from a direction of reflection vector R as seen from a direction of view vector V. For example, the fall-off may be modeled by $\cos^s \alpha$, where S is a surface material's specular-reflection coefficient and a is an angle between vectors R and V. In practice, a dot product term $(N●H)^s$ is often used in place of $\cos^s \alpha$ to model specular reflection at a surface point, where N is a normal vector and H is a half-angle vector.

The spotlight model, on the other hand, adds a direction to a positional light source to allow modeling of directional lights. That is, a spotlight is a special type of light source that has a direction as well as a position. For example, a positional light source may function as a spotlight by restricting the shape of the light to a cone. The direction of the spotlight is the direction in which the light points. The spotlight thereby simulates a cone of light, which may have a fall-off in intensity based upon the distance from the center of the cone of light. As is well known in the art, a spotlight value is typically computed in accordance with a basic spotlight equation, spotlight=$(S●L)^{exp}$, where S represents a spotlight source direction vector, L represents the vector from a point on the surface to the light source, and exp is a spotlight exponent. The spotlight equation may also include other well-known variables such as attenuation, shadow, etc.

The diffuse, specular, and spotlight models are well known and: are described in greater detail in *Computer Graphics: Principles and Practice* by James D. Foley et al., Addison-Wesley (1996), ISBN 0-201-84840-6, which is incorporated herein by reference. Additionally, the OpenGL™ (versions 1.1 and 1.2) application programming interface (API) describes various lighting models such as spotlighting, diffuse light reflection, specular light reflection, and related parameters for implementing such models. The OpenGL™ (versions 1.1 and 1.2) graphics application programming interface is commercially available from Silicon Graphics, Inc., the assignee of the present application, and is incorporated herein by reference.

Lighting models often include diffuse, specular, and spotlight units for evaluating the diffuse, specular, and spotlight values. For example, U.S. patent application Ser. No. 09/265,507 entitled "Method and Device for Generating Per-Pixel Values" by inventors David C. Tannenbaum et al. describes a lighting subsystem that includes a diffuse light unit, a specular light unit, and a spotlight unit, for determining the diffuse, specular, and spotlight values. Each of these units evaluates a dot product of vectors (e.g., N, L, S) for computing lighting values.

In computer graphics, however, evaluating light values often requires computing cross products of two vectors. For example, cross products are evaluated to find a vector that is at right angles, i.e., a normal vector, to two other vectors. The normal vectors such as N are routinely used in evaluating light values as described above.

A surface normal vector N at a point P (e.g., vertex, pixel, etc.) may be determined from a pair of vectors originating at the point to associated target points. Unless these vectors are parallel to each other, the vectors define a plane. In practice, the pair of vectors may be obtained by coordinates of the original point to the target coordinates of the associated vectors. Evaluating a cross product of these vectors yields a normal vector that may be used as a surface normal vector depending, for example, on the view direction and the order of the cross product.

Conventional computer graphics systems typically evaluate cross products by using general purpose processors or dedicated cross product units. These approaches, however, may degrade performance or add substantial cost. For example, given that normal vectors can be computed for thousands or even millions of points in a scene, employing the general purpose processors to evaluate cross products may significantly limit the performance of the computer graphics systems. On the other hand, using a cross product unit dedicated to evaluating cross products may be costly to implement within the limited die size of integrated circuit chips.

Thus, what is needed is a device and method for efficiently evaluating cross products of vectors without the performance penalty of the general purpose processors or the cost associated with dedicated cross product units.

SUMMARY OF THE INVENTION

Broadly speaking, the present invention fills these needs by providing a dual ode device and method for generating vector cross products or dot products. It should be appreciated that the present invention can be implemented in numerous ways, including as a process, an apparatus, a system, a device, a method, or a computer readable medium.

In one aspect of the invention, the dual mode device generates a cross product or a dot product from a first vector and a second vector. The first vector has a first set of components and the second vector has a second set of components. The device includes a dual mode controller and a dual mode unit. The dual mode controller receives the first and second vectors and is configured to select vector components for evaluating a cross product component or a dot product in response to a first signal. The first signal indicates whether to generate a cross product component or a dot product. The dual mode unit is coupled to receive the selected vector components and generates the cross product component or the dot product in response to the first signal.

The present invention advantageously provides a device and method that can efficiently evaluate a cross product or a dot product by using shared logic units such as multipliers and adders. By thus sharing resources for generating cross products and dot products, the dual mode device of the present invention significantly reduces the cost of the hardware needed to implement both dot product units and cross product units. At the same time, providing a dedicated dual mode device for evaluating cross product or dot product enhances performance without the performance penalty associated with using general purpose processors. The dual mode device and method may be implemented in any suitable manner. For example, by implementing the dual mode devices in conventional lighting units adapted to evaluate dot products, the present invention provides additional functionality at a minimal cost. Other aspects and advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

Reference will now be made to the present preferred embodiments of the invention, examples of which are illustrated in the accompanying drawings. In the following detailed description of the present invention, which includes a dual mode device and method for generating vector cross products or dot products, numerous specific details are set forth to provide a thorough understanding of the present invention. It will be obvious to one skilled in the art, however, that the present invention may be practiced without these specific details. In other instances, well-known methods, procedures, components, and circuits have not been described in detail so as not to unnecessarily obscure certain aspects of the present invention.

Figure 1A:
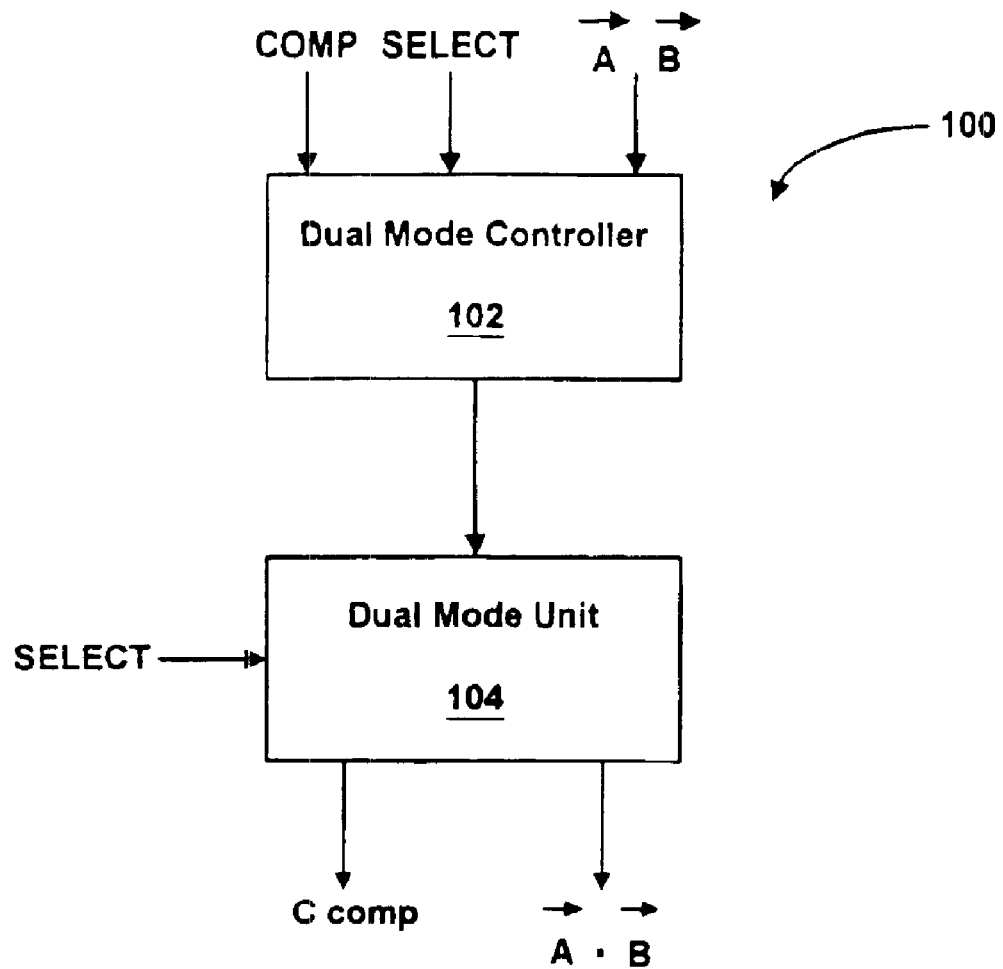
FIG. 1A shows a schematic block diagram of an exemplary dual mode device for generating either cross product components or dot products from a pair of vectors A and B in accordance with one embodiment of the present invention.

FIG. 1A shows a schematic block diagram of an exemplary dual mode device 100 for generating either cross product components or dot products from a pair of vectors A and B in accordance with one embodiment of the present invention. The dual mode device includes a dual mode controller 102 and a dual mode unit 104. The dual mode controller 102 receives signals SELECT and COMP, and vectors A and B, which are preferably received as vector components (Ax, Ay, Az) and (Bx, By, Bz), respectively.

The signal SELECT indicates whether to generate a cross product vector component $C_{COMP}$ or a dot product A●B. Hence, the SELECT signal indicates the mode, either cross product or dot product mode, the device 100 is to operate in. On the other hand, the input signal COMP indicates the vector component $C_{COMP}$ (e.g., x, y, or z cross product vector component) of a cross product to be determined. As will be described in more detail below, in response to the SELECT and COMP signals, the dual mode controller 102 selects components of the vectors A and B needed for evaluating the cross product component $C_{COMP}$ or dot product. The dual mode controller 102 may also apply or change signs of one or more selected vector components to subsequently effect a subtraction for computing the cross product component $C_{COMP}$.

The dual mode unit 104 is coupled to the dual mode controller 102 to receive the selected vector components and signal SELECT for generating either $C_{COMP}$ or dot product A●B. Specifically, the dual mode unit 104 operates in either a cross product mode or a dot product mode in response to SELECT signal. In a cross product mode, the dual mode unit 104 generates the cross product component $C_{COMP}$ while it generates dot product A●B in the dot product mode. As will be described in more detail below, the dual mode unit 104 includes one or more adders and multipliers that are used in evaluating both the dot products and cross product components.

Those skilled in the art will appreciate that the device 100 may also include a plurality of dual mode controllers and dual mode units for generating other cross product components in parallel. For example, the dual mode controller 102 and dual mode unit 104 may be used to compute an x-component Cx (i.e., AyBz–AzBy) of cross product vector A×B while other dual mode controllers and units are used to evaluate a y-component Cy (i.e., AzBx–AxBz) and a z-component Cz (i.e., AxBy–AyBx) of cross product vector A×B. In addition, for computing all components of a cross product vector, the dual mode controller may also be configured to sequentially iterate through each of the components Cx, Cy, and Cz.

Figure 1B:
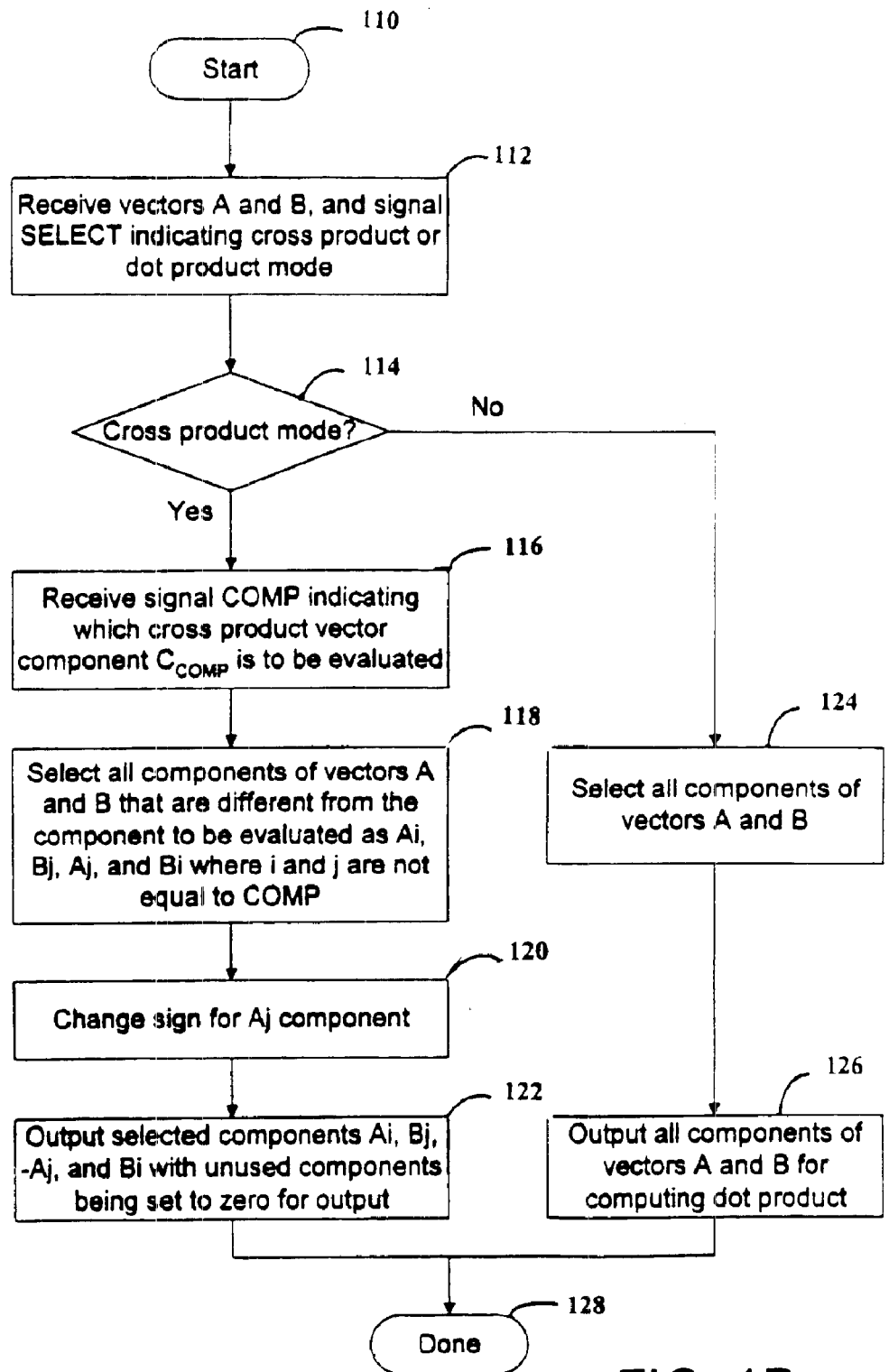
FIG. 1B shows a flowchart of an exemplary method implemented by the dual mode controller in accordance with one embodiment of the present invention.

FIG. 1B shows a flowchart of an exemplary method implemented by the dual mode controller 102 in accordance with one embodiment of the present invention. The method begins in operation 110 and proceeds to operation 112, where vectors A and B, and signal SELECT indicating cross product or dot product mode are received. Then, it is determined in operation 114 whether the signal SELECT indicates a cross product mode. If so, the method proceeds to operation 116, where signal COMP indicating a cross product vector component $C_{COMP}$ to be evaluated is received.

Then, in operation 118, all components of vectors A and B that are different from the component $C_{COMP}$ to be evaluated are selected for determining $C_{COMP}$. For example, for three-component vectors A and B having components (Ax, Ay, Az) and (Bx, By, Bz), respectively, components Ay, Az, By, and Bz are selected for computing x-component cross product Cx. The selected components Ay, Az, By, and Bz may be designated or labeled as Ai, Aj, Bi, and Bj, respectively. The following Table 1 tabulates selection of vector components and designation of the selected vectors as Ai, Aj, Bi, and Bj, where i and j are different from the component to be evaluated.

TABLE 1

| COMP | Ai | Bj | Aj | Bi |
|------|----|----|----|----|
| x | Ay | Bz | Az | By |
| y | Az | Bx | Ax | Bz |
| z | Ax | By | Ay | Bx |

After selecting the components for computing the cross product component $C_{COMP}$, a sign is applied or changed, in operation 120, for a component selected from either Aj or Bi. For instance, for computing x-component Cx, the sign of either Az or By may be changed to –Az or –By to implement the standard cross product equation. It should be noted that the sign of only one component, and not both components, is changed in this manner. The selected components are then output, in operation 122, to the dual mode unit 104 as Ai, Bj, –Aj, and Bi for evaluating the cross product component $C_{COMP}$. Alternatively, the selected components may be output as Ai, Bj, Aj, and –Bi.

If in operation 114, it is determined that the mode is not cross product, the method proceeds to operation 124, where all components of the vectors A and B are selected. All these components are then output, in operation 126, to the dual mode unit 104 for evaluating the dot product A●B. The method then terminates in operation 128.

Figure 1C:
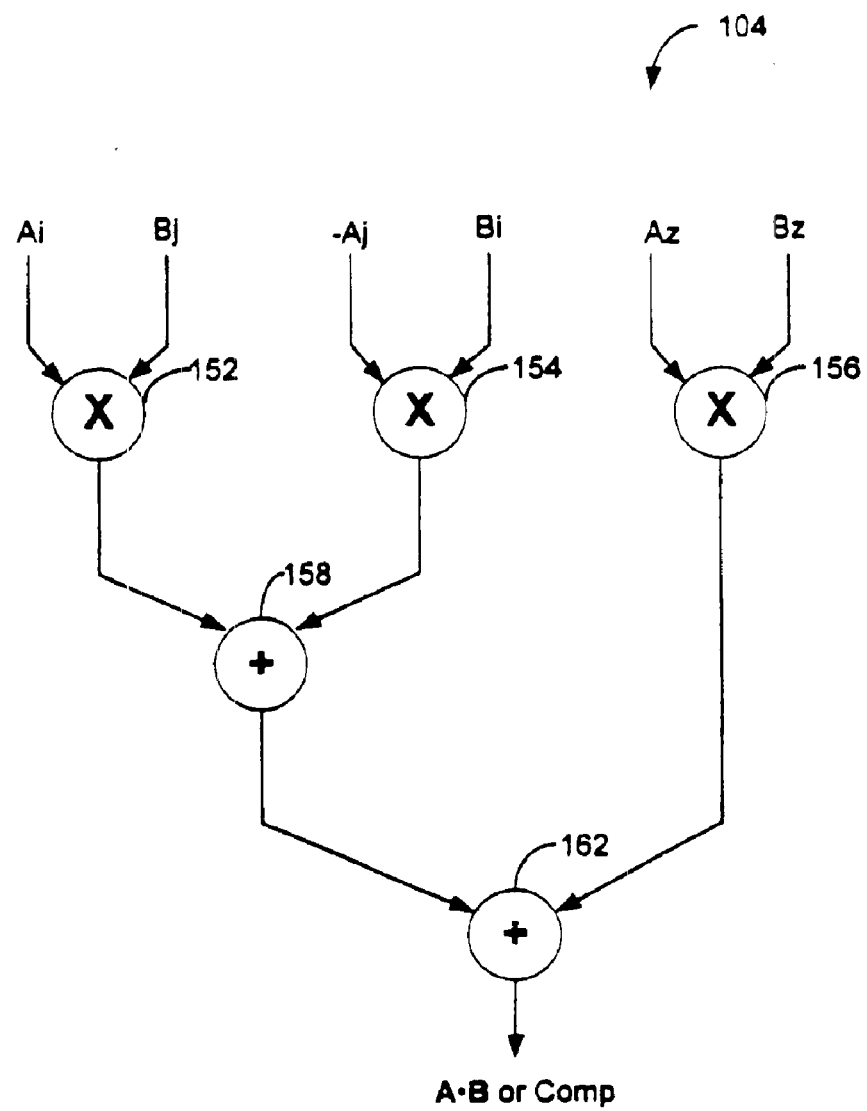
FIG. 1C illustrates a more detailed block diagram of the dual mode unit for generating $C_{COMP}$ or dot product A●B in accordance with one embodiment of the present invention.

FIG. 1C illustrates a more detailed block diagram of the dual mode unit 104 for generating $C_{COMP}$ or dot product A●B in accordance with one embodiment of the present invention. The dual mode unit 104 includes multipliers 152, 154, and 156, and adders 158 and 162. The multipliers 152, 154, and 156 are arranged to receive selected vector components from the dual mode controller 102 for input. Specifically, when SELECT signal indicates cross product mode, multiplier 152 receives and multiplies vector components designated Ai and Bj to generate product AiBj while multiplier 154 receives and multiplies vector components designated as –Aj and Bi to produce –AjBi. Simultaneously, multiplier 154 may be disabled or receive zeros as inputs. Adder 158 receives and adds the products AiBj and –AjBi to generate a sum (AiBj–AjBi) to be output as $C_{COMP}$.

On the other hand, when SELECT signal indicates dot product mode, multipliers 152, 154 and 156 are used to multiply x-, y-, and z-components of vectors A and B. For example, multiplier 152 receives and multiplies x-components Ax and Bx to generate AxBx; multiplier 154 receives and multiplies y-components Ay and By to produce AyBy; and multiplier 156 receives and multiplies vector z-components Az and Bz to generate AzBz. Adder 158 receives and adds AxBx and AyBy from multiplier 152 and 154, respectively, to produce a sum (AxBx+AyBy). Adder 162 receives and adds product AzBz and the sum (AxBx+AyBy) from multiplier 156 and DEMUX 160, respectively, to generate a sum (AxBx+AyBy+AzBz), which is the dot product of vectors A and B.

In the dual mode device 104, the multipliers 152 and 154, and the adder 162 are used for evaluating both the cross product component and the dot product. By thus sharing resources for generating cross products and dot products, the dual mode device of the present invention significantly reduces the cost of the hardware needed to implement both dot product units and cross product units. For example, the implementation of the dual mode devices provides enhanced functionality at a minimal cost in conventional lighting units adapted to evaluate dot products. It should be noted also that the normalization logic already present for the dot product can be used for the cross product.

Figure 2:
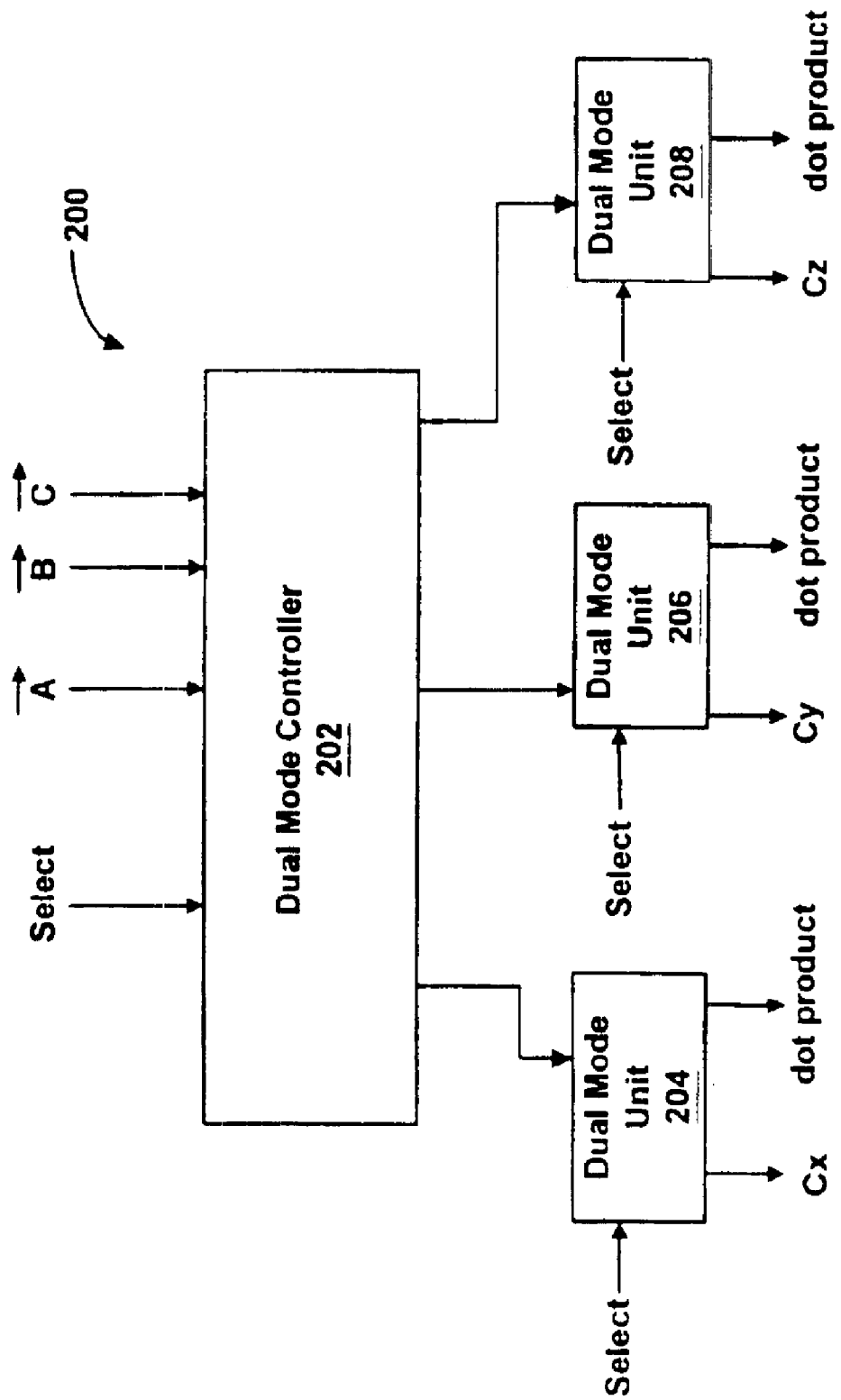
FIG. 2 shows a schematic block diagram of an exemplary dual mode device for generating either cross product or dot product from a pair of vectors in accordance with one embodiment of the present invention.

A dual mode device, in one embodiment, may include a dual mode unit 104 (e.g., sub-dual mode unit) for each of the components of a cross product vector C. For example, FIG. 2 shows a schematic block diagram of an exemplary dual mode device 200 for generating either cross product or dot product from a pair of vectors in accordance with one embodiment of the present invention. The vectors A and B include x, y, and z components. The dual mode device 200 includes a dual mode controller 202 and dual mode units 204, 206, and 208. The dual mode units 204, 206, and 208 are used to generate x-, y-, and z-components, respectively, of the cross product vector C during cross product mode. In addition, each of the dual mode units 204, 206, and 208 may be used to receive a pair of vectors such as A and B for evaluating a dot product in dot product mode.

The dual mode controller 202 receives vectors A, B, and signal SELECT that indicates whether to generate a cross product or dot product. Specifically, in response to SELECT signal, the dual mode controller 202 selects components of vectors A and B and routes the selected components to the dual mode units 204, 206, and 208 for evaluating cross product vector components, Cx, Cy, and Cz, respectively.

The selection and routing of each of the vector components are carried out in a manner similar to the method described in FIG. 1B.

Dual mode devices of the present invention may be used in any applications where vector cross products or dot products are needed. For example, the dual mode devices may be used to generate cross or dot products used in electromagnetics, computer graphics, electromechanics, and any other applications that use such products. In a preferred embodiment, the dual mode devices of the present invention are used to evaluate cross products or vector products in computer graphics systems configured to generate diffuse light, specular light, and spotlight values.

For example, U.S. patent application Ser. No. 09/265,507 entitled "Method and Device for Generating Per-Pixel Values," by inventors David C. Tannenbaum et al. describes an exemplary computer system that includes hardware units adapted to evaluate dot products for generating diffuse light, specular light, and spotlight values. The dual mode devices of the present invention may be implemented in the diffuse light, specular light, and spotlight units to generate cross products in addition to generating dot products.

Figure 3:
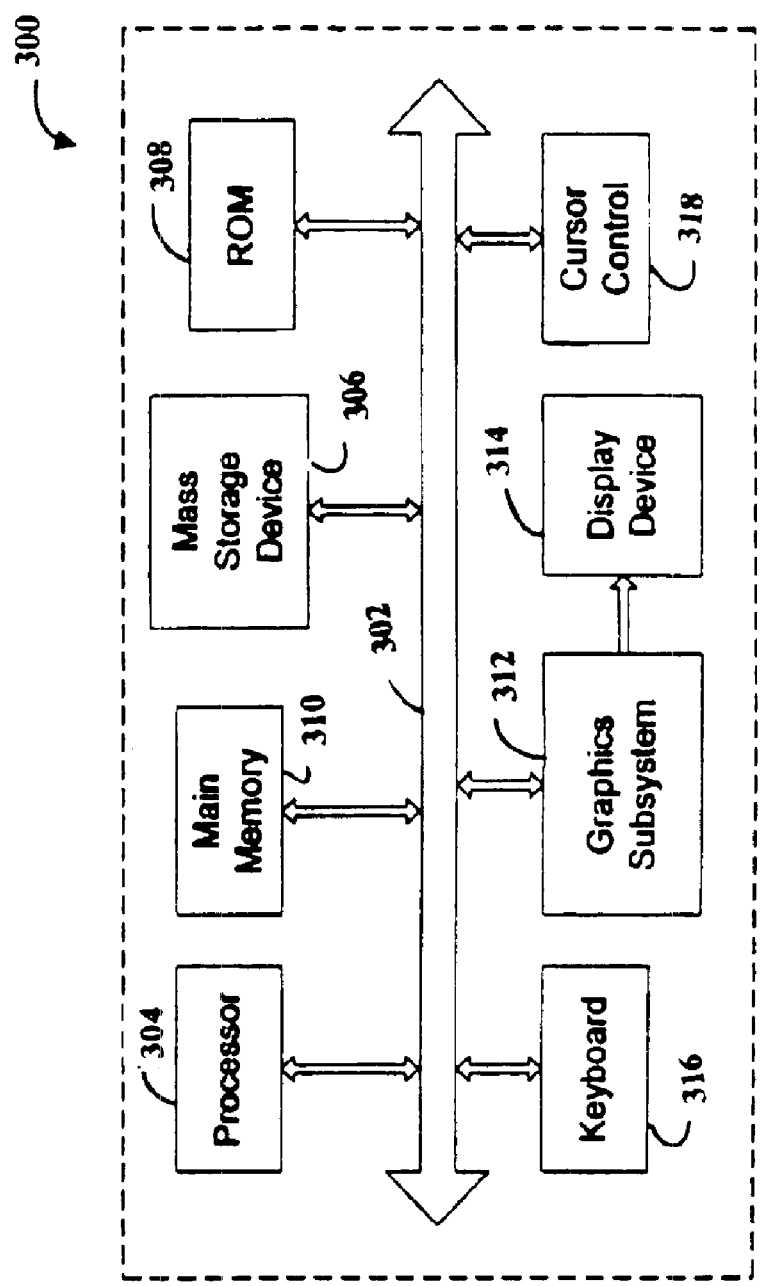
FIG. 3 illustrates a block diagram of an exemplary computer graphics system within which the dual mode devices may be implemented or practiced.

By way of example, FIG. 3 illustrates a block diagram of an exemplary computer graphics system 300 within which the dual mode devices may be implemented or practiced. It should be borne in mind that the computer graphics system 300 is exemplary only and that the present invention can operate within a number of different computer system configurations including general purpose computer systems, embedded computer systems, and computer systems specially adapted to electronic design automation. In describing various embodiments of the present invention, certain processes and operations are realized as a series of instructions (e.g., software programs) that reside within computer readable memory units of computer graphics system 300 and are executed by processors therein.

The computer graphics system 300 may be any computer-controlled graphics system suitable for generating complex 2D or 3D images. The computer graphics system 300 includes a bus 302 for transmitting information between the various parts of the computer system. One or more processors 304 for processing information are coupled to the bus 302. The information, together with the instructions for processing the information, are stored in a hierarchical memory system comprised of a mass storage device 306, a read only memory (ROM) 308, and a main memory 310. The mass storage device 306 is used to store a vast amount of data and may include one or more hard disk drives, floppy disk drives, optical disk drives, tape drives, CD-ROM drives, or any number of other types of storage devices having media for storing data. The ROM 308 is used to store data on a permanent basis, such as instructions for the microprocessors. The main memory 310 is used for storing data on an intermediate basis and may be implemented as DRAM, SDRAM, RDRAM, or any other suitable memory for storing data for the computer graphics system 300.

A graphics subsystem 312 may be included in the computer graphics system 300. The processor 304 provides the graphics subsystem 312 with graphics data, such as drawing commands and primitives including coordinate vertex data (e.g., pixel color, surface normal vector N, light vector L, and view vector V), and other data related to an object's geometric position, color, texture, shading, and other surface parameters. A display device 314 is coupled to the graphics subsystem 312 to receive image data (e.g., pixel data) for display. Alternatively, the display device 314 may be coupled to the computer graphics system 300 via the bus 302.

Other devices also may be coupled to the computer graphics system 300. For example, an alphanumeric keyboard 316 may be used for entering commands and other information to processor 304 via the bus 302. Another type of user input device is cursor control device 318 (e.g., mouse, trackball, joystick, and touchpad) used for positioning a movable cursor and selecting objects on a computer screen.

Figure 4:
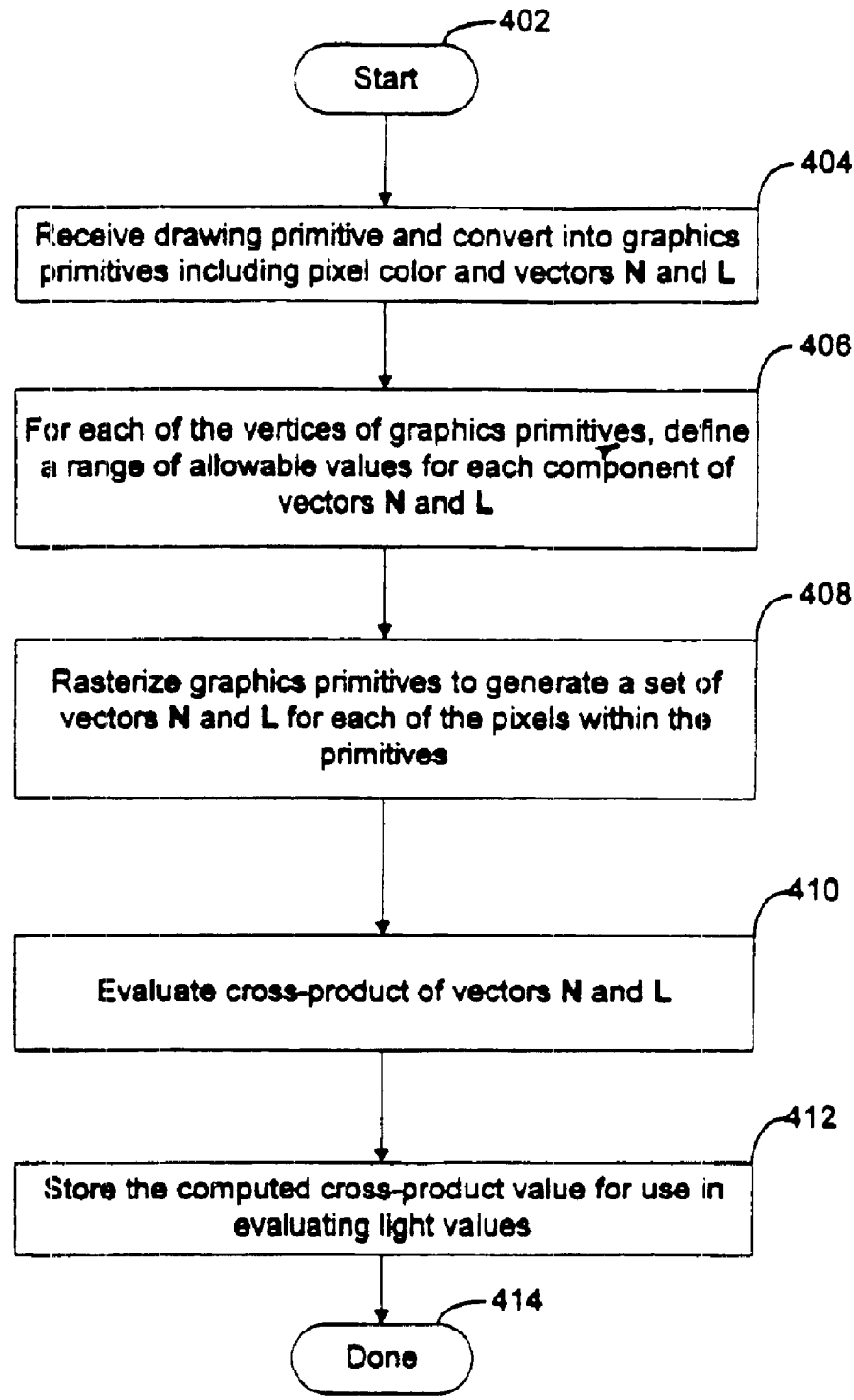
FIG. 4 shows a flow chart of an exemplary method performed by a graphics subsystem when evaluating a vector cross product.

FIG. 4 shows a flow chart of an exemplary method performed by the graphics subsystem 312 when evaluating a vector cross product. The method starts in operation 402 and proceeds to operation 404, where drawing primitives are received and converted into graphics primitives including pixel color, and exemplary vectors N and L. The pixel data preferably includes pixel position data within an associated graphics primitive such as a polygon. Although the present invention is illustrated using vectors N and L, those skilled in the art will appreciate that it may also employ a pair of any suitable vectors for evaluating a cross product vector.

In operation 406, a range of allowable values for each component of vectors N and L may be defined for each of the vertices of the graphics primitive to save hardware in subsequent stages. Next, in operation 408, the graphics primitives are rasterized to generate a set of N and L vectors for each of the pixels within the primitives. Then in operation 410, the graphics subsystem 312 generates a cross product of the vectors N and L. The generated cross product vector is then stored in operation 412 to be used, for example, in evaluating light values. The method then terminates in operation 414.

Figure 5:
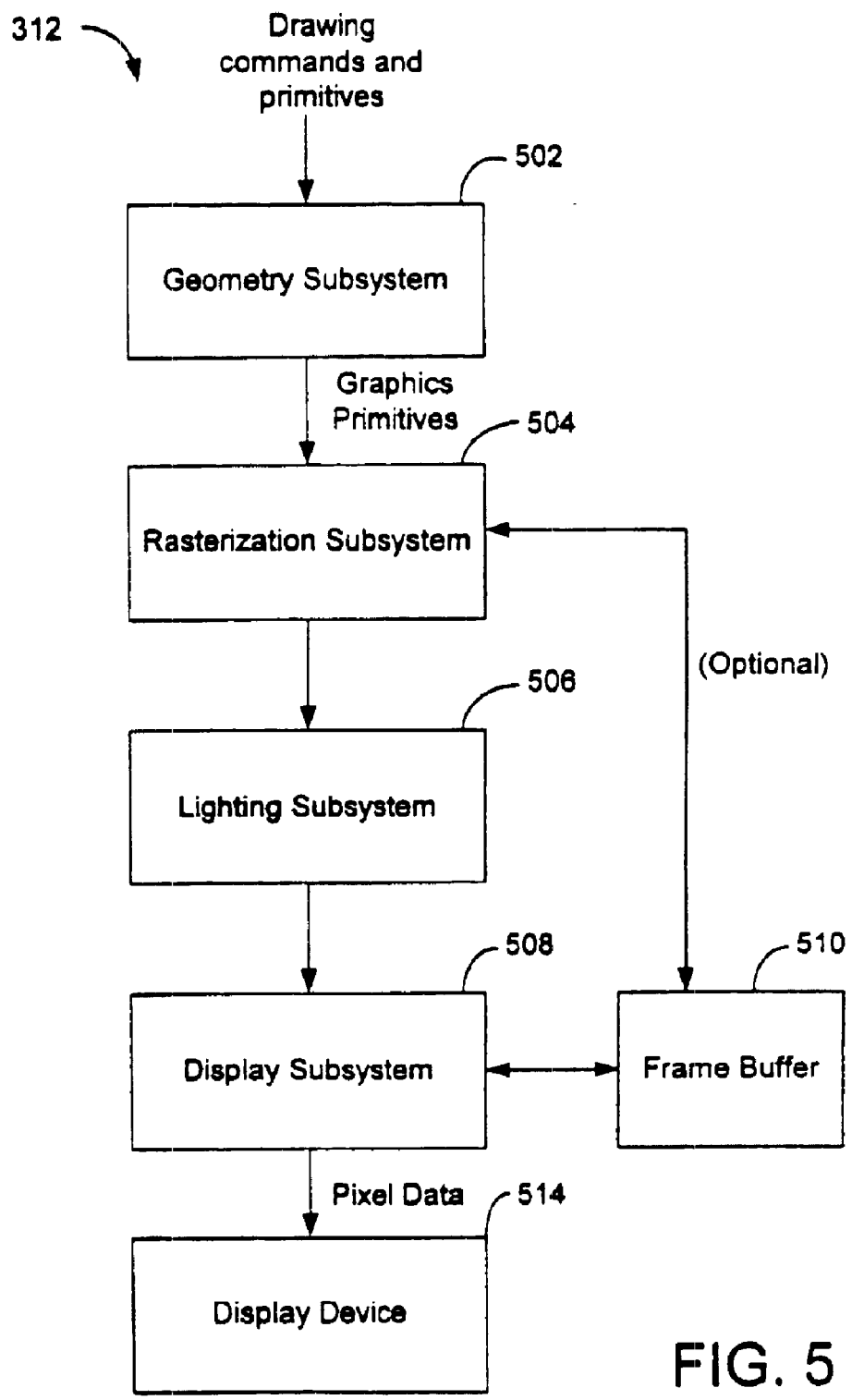
FIG. 5 illustrates a more detailed block diagram of the graphics subsystem in accordance with one embodiment of the present invention.

FIG. 5 illustrates a more detailed block diagram of the graphics subsystem 312 in accordance with one embodiment of the present invention. The graphics subsystem includes a geometry subsystem 502, a rasterization subsystem 504, a lighting subsystem 506, a display subsystem 508, and a frame buffer 510. In this configuration, the geometry subsystem 502 receives drawing commands and primitives including pixel color, N, L, V, per-primitive values such as S and other parameters at each vertex for conversion into graphics primitives. These well known vectors are described, for example, in U.S. patent application Ser. No. 09/265,507, which was previously incorporated by reference herein.

For each of the vertices of the graphics primitives, the geometry subsystem 502 preferably defines a predetermined range of allowable values for each component of the N, L, and V vectors. For example, for the normal vector N, the x, y, and z components, Nx, Ny, and Nz, may be defined to be in the range of [−2,2), which specifies a range from −2 inclusive to 2. To ensure that each of the components of a vector falls within the predetermined range of allowable values, each of the components of the vector may be divided by the largest component of the vector. Consequently, the magnitude of any component of the N, L, and V vectors is assured to be within the predetermined range. Although the preferred embodiment defines a predetermined range, those skilled in the art will appreciate that the present invention also may be implemented without defining such a predetermined range.

The resulting graphics primitives (e.g., points, lines, polygons, etc.) are then provided to the rasterization subsystem 504, which is coupled to the geometry subsystem 502. The rasterization subsystem 504 converts the received graphics primitives into pixel data. In addition, the rasterization subsystem 504 rasterizes the graphics primitives to generate a set of N, L, and V vectors for each of the pixels within the primitives. At this stage, the rasterization subsystem 504 may also perform Z-buffering, blending, texturing, and antialiasing functions.

The lighting subsystem 506 is coupled to receive the pixel values such as vectors N, L, V, and S and material property values from the rasterization subsystem 504. As will be discussed in more detail below, the lighting subsystem 506 generates light values for each of the pixels on a per pixel basis in accordance with one of the embodiments of the present invention. The light values for each of the pixels are then transmitted to the display subsystem 508 and stored in the frame buffer 510. The display subsystem reads the frame buffer 510 and transmits the lighted pixel data values to the display device 514 for display. It should be noted that the frame buffer 510 may also be used by other subsystems (e.g., rasterization subsystem 504) in the graphics subsystem 312 to perform assigned functions.

Figure 6:
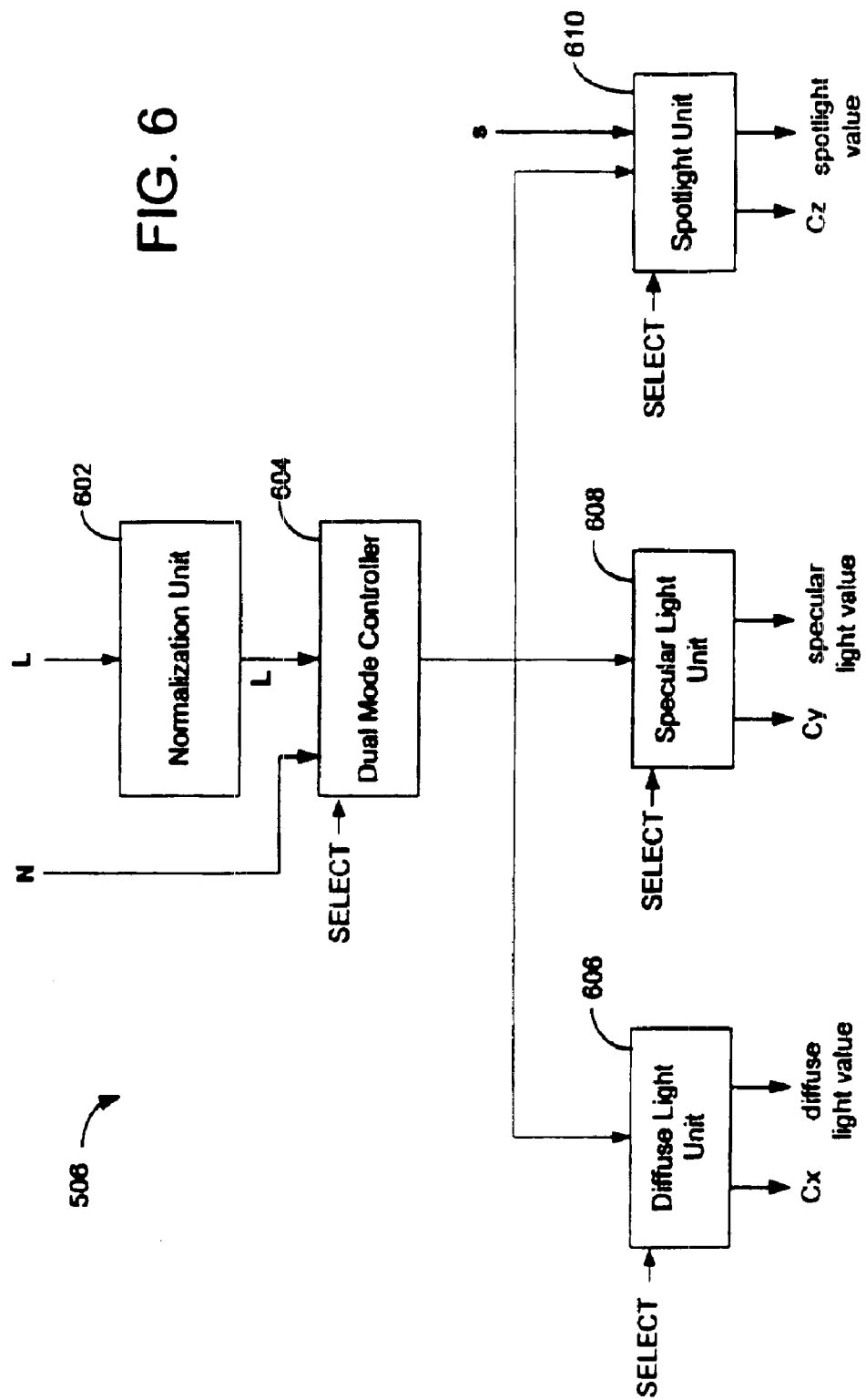
FIG. 6 illustrates a more detailed block diagram of an exemplary lighting subsystem operating in cross product mode in accordance with one embodiment of the present invention.

FIG. 6 illustrates a more detailed block diagram of the exemplary lighting subsystem 506 operating in cross product mode. The lighting subsystem 506 includes a normalization unit 602, dual mode controller 604, a diffuse light unit 606, a specular light unit 608, and a spotlight unit 610. The normalization unit 602 receives vector L and normalizes it into a unit vector. The dual mode controller 604 receives normalized vector L, unnormalized vector N, and SELECT signal indicating a cross product mode. Similar to the dual mode controller 200 of FIG. 2, the dual mode controller 604 selects appropriate vector components of L and N and applies proper signs to one or more components needed for computing cross product components Cx, Cy, and Cz. The dual mode controller 604 then outputs the selected vector components needed for computing Cx, Cy, and Cz to the diffuse light unit 606, specular light unit 608, and spotlight unit 610, respectively.

Each of the units 606, 608, and 610 receives and operates in response to SELECT signal indicating cross product mode to generate and output x-, y-, and z-components of the cross product. The diffuse light unit 606 computes an x-component Cx of the cross product of normalized vectors N and L in a log space (e.g., base-two log space). This facilitates normalization of the vectors as described in U.S. patent application Ser. No. 09/265,507, which was previously incorporated by reference herein.

Similarly, the specular light unit 608 evaluates a y-component Cy of the cross product in the log space. Likewise, the spotlight unit 610 determines a z-component Cz of the cross product in the log space.

In one embodiment, each of the resulting products in the log space may then be used as an index to an anti-log base two function defined as $x=2^{-y}$, where x is a desired output and y is the index. Preferably, the logarithm and anti-log functions are implemented by using lookup tables followed by linear interpolation. Although the use of linear interpolation is described herein, those skilled in the art will appreciate that other suitable interpolation techniques such as, for example, bi-cubic interpolation and other higher order interpolation techniques, also may be used. Furthermore, the components Cx, Cy, and Cz terms may be converted to a floating-point format with an exponent portion and a fraction portion. This conversion allows a maximum number of significant bits to be fed into a lookup table (e.g., 64-entry lookup table) by using the fraction as an index to the lookup table.

In accordance with one embodiment of the present invention, log or anti-log values over a predefined range, Xf in 1.ffff format (e g., [1.0,2.0)) are found by coding a lookup table and performing a lookup operation in the table. In particular, a floating-point number that includes a fraction part and an exponent part may be employed to perform the log table lookup and interpolation operation to convert the number into a log space. The log and anti-log tables may be implemented by having positive or, more preferably, negative arguments as indices of the tables. A portion of the fraction part may be used as an index to the lookup table that tabulates log values corresponding to a predetermined range of the floating-point number.

For example, the high-order six bits in a 16-bit fraction may be used to select an entry in a lookup table. Then, the remaining fraction bits are used to determine a log or anti-log value corresponding to the fraction by interpolating between the selected entry and the next entry. In an alternative embodiment, the log or anti-log values of a fraction may be determined by performing only a table lookup operation. In this case, the lookup table is provided with a number of entries sufficient to obtain the desired output precision.

Figure 7:
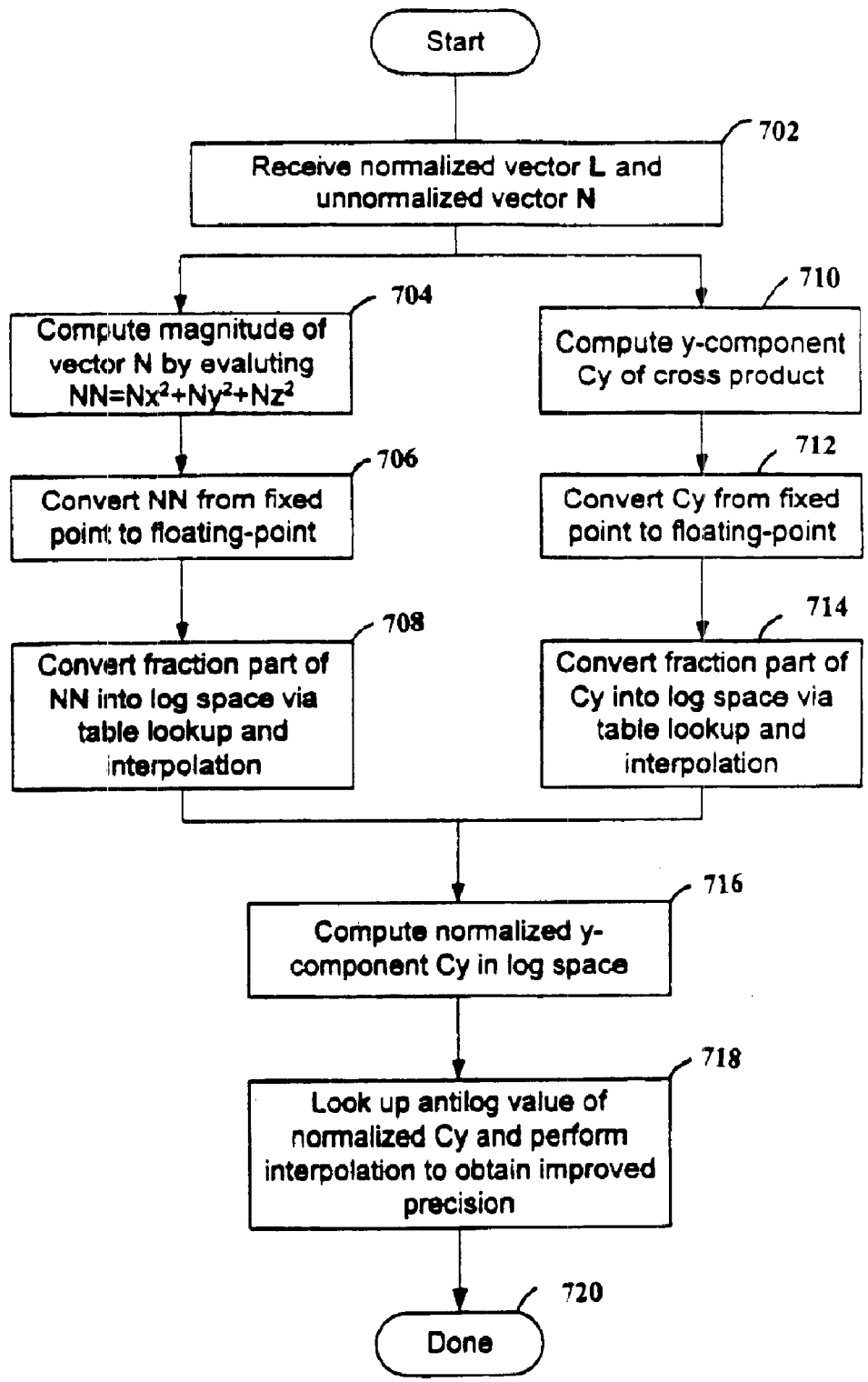
FIG. 7 shows a flowchart of an exemplary method performed by a specular light unit for generating a normalized cross product component Cy.

The log space and floating-point formats may be used to compute normalized cross product components with improved precision. By way of example, FIG. 7 shows a flowchart of a method performed by the specular light unit 608 to generate a normalized cross product component Cy. In operation 702, normalized vector L and unnormalized vector N are received, preferably in a Cartesian coordinate format: Nx, Ny, and Nz; Lx, Ly, and Lz. In one embodiment of the invention, each component is received in S1.14 format.

The method then proceeds to two parallel branches of operations. Specifically, in operation 704, a value of NON is determined by computing $NN=Nx^2+Ny^2+Nz^2$, which yields the magnitude of vector N. At the same time, the y-component value (i.e., inner product) of the cross product is determined in operation 710 by computing Cy=(NzLx−NxLz). The computed values NN and Cy are preferably in fixed-point formats such as U4.28 and S4.28, respectively, where S signifies a sign bit and U signifies an unsigned number.

The computed values NN and Cy are then converted from the fixed-point formats to floating-point formats in parallel in operations 706 and 712, respectively. For example, NN may be converted from the fixed-point format U4.28 into a floating-point format that includes an exponent portion $e_{NN}$ and a fraction portion $f_{NN}$. Similarly, Cy may be converted from a fixed-point format S4.28 into a floating-point format that includes an exponent portion $e_{cy}$ and a fraction portion $f_{cy}$. Then, in operation 708, the fraction part $f_{NN}$ is converted into a log space using a table lookup and interpolation process. Similarly, the fraction part $f_{cy}$ of the y-component Cy is also converted, in operation 714, into the log space by a table lookup and interpolation process.

In operation 716, normalized inner product Cy is computed by a log arithmetic operation by computing a difference term $\{\log_2(Cy)-[(\frac{1}{2})*\log_2(NN)]\}$. In one embodiment, the logarithms of Cy and NN can be determined in accordance with the equation $\log_2(X)=Xe+\log_2(Xf)$. For example, the exponent ey may be shifted left by 16 places and the $\log_2(f_{cy})$ value may then be appended for $e_{cy}$. Similarly, the exponent $e_{NN}$ may be shifted 15 places for NN exponent $e_{NN}$ with $\log_2(f_{NN})$ appended. These shifts result in appending 16 fraction bits to the right of the binary point for $e_{cy}$ and 15 fraction bits for $e_{NN}$. The difference of 1 fraction bit is provided to effectively divide $e_{NN}$ by two. Subtracting one-half of $e_{NN}$ effectively results in dividing by the square root in the original non-log space, thus affecting the vector normalization.

In operation 718, the normalized component Cy in the log space is converted back into the original number space format by an anti-log table lookup and interpolation process. Preferably, the original number space is a non-log space, which may be any number space other than the logarithm space. The method then terminates in operation 720. The x- and z-components, Cx and Cz, can be generated using the diffuse light unit 606 and the spotlight unit 610 in a similar manner.

Figure 8:
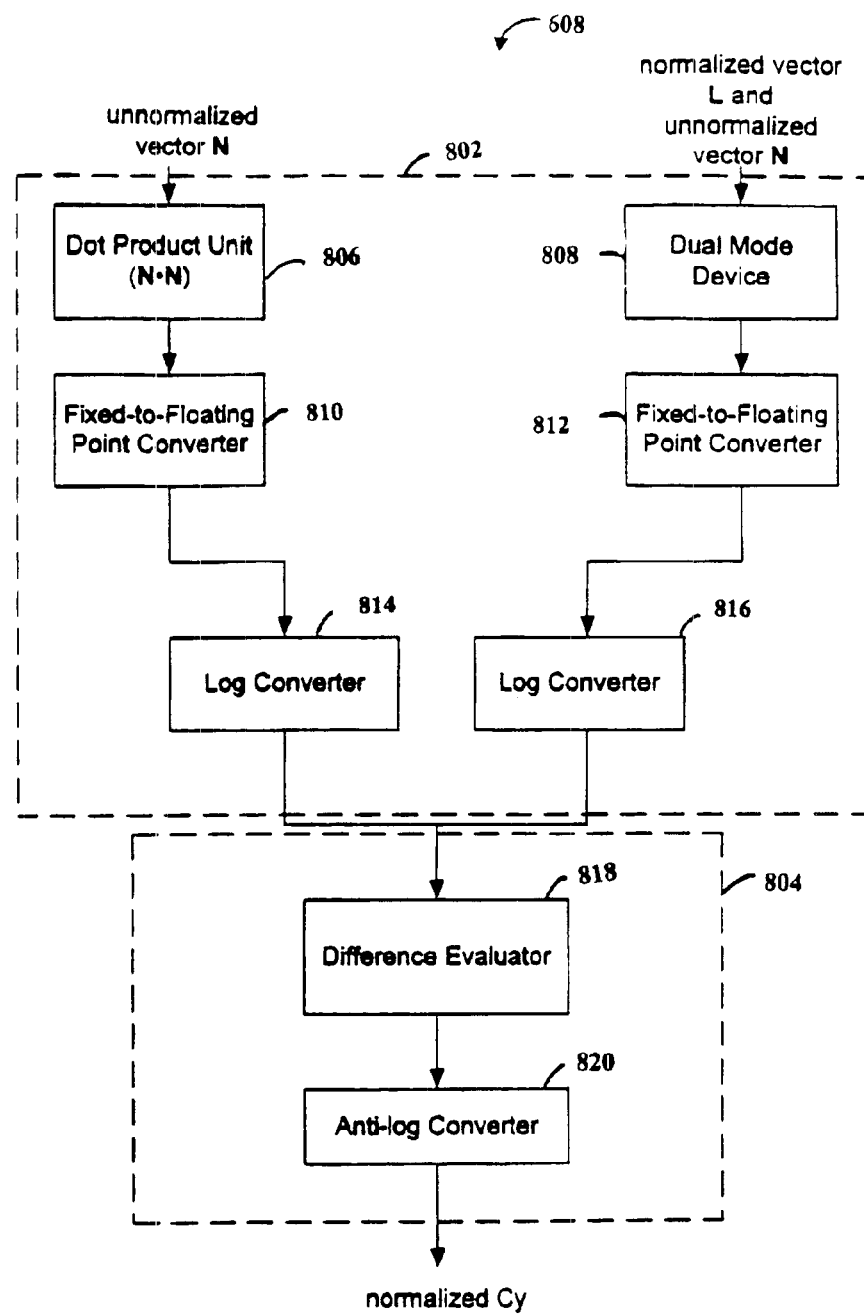
FIG. 8 illustrates a more detailed block diagram of a specular light unit in generating a normalized cross product component Cy in accordance with one embodiment of the present invention.

FIG. 8 illustrates a more detailed block diagram of the specular light unit 608 in generating a normalized cross product component Cy in accordance with one embodiment of the present invention. The specular light unit 608 includes a log space converter 802 and a pixel evaluator 804. The log space converter 802 receives parameters associated with a pixel such as, for example, N and L vectors, and converts the parameters to obtain a set of log parameters. The pixel evaluator 804 is coupled to the log space converter 802 to receive the set of log parameters and determines a cross product component Cy for the pixel by evaluating this set of log parameters.

The log space converter 802 includes a dot product unit 806, a dual mode device 808, fixed-to-floating point converters 810 and 812, and a pair of log converters 814 and 816. The dot product unit 806 receives an unnormalized N vector and evaluates the dot product N●N by computing $NN=Nx^2+Ny^2+Nz^2$. On the other hand, the dual mode device 808 receives a normalized vector L and an unnormalized vector N and determines Cy by computing Cy= (NzLx−NxLz).

The fixed-to-floating point converters 810 and 812 receive and convert fixed-point inputs NN and Cy, respectively, into a floating-point format. Specifically, the fixed-to-floating point converter 810 converts NN from a fixed-point format (e.g., U4.28) into a floating-point format that includes an exponent portion $e_{NN}$ and a fraction portion $f_{NN}$. Likewise, the fixed-to-floating point converter 812 converts Cy from a fixed-point format (e.g., S4.28) into a floating-point format that includes an exponent portion $e_{cy}$ and a fraction portion $f_{cy}$.

The log converter 814 receives the NN value and converts the fraction part $f_{NN}$ into log space (e.g., base-two log space) via a table lookup and interpolation process. Similarly, the log converter 816 receives the floating-point value $f_{cy}$ of the Cy value and converts the fraction part $f_{cy}$ into log space via a table lookup and interpolation process.

The pixel evaluator 804 includes a difference evaluator 818 and an anti-log converter 820. The difference evaluator 818 receives the log space values NN and Cy to compute normalized cross product component Cy in the log space. The difference evaluator 818 preferably computes the normalized Cy by computing a difference term, $\{\log_2(Cy)-[(\frac{1}{2})*\log_2(NN)]\}$. It should be noted that the subtraction operation in the log space is equivalent to the division operation in a non-log number space.

The anti-log converter 820 is configured to receive the normalized cross product component Cy in the log space for conversion. Specifically, the anti-log unit 820 converts the normalized cross product component Cy in the log space back into the original non-log number space format using an anti-log table lookup and interpolation process. The anti-log converter 820 then outputs the normalized cross product component Cy value in the original number space with enhanced precision. Those skilled in the art will recognize that the x- and z-components, Cx and Cz, of a cross product may be evaluated in a manner similar to the y-component, Cy, with minor modifications to the method and device shown in FIGS. 7 and 8, respectively. The present invention thus provides a dual mode device and method that can generate vector cross products and dot products by sharing hardware resources. The invention has been described herein in terms of several preferred embodiments. Other embodiments and equivalents of the invention will be apparent to those skilled in the art from consideration of the specification and practice of the invention. The embodiments and preferred features described above should be considered exemplary, with the invention being defined by the appended claims.

What is claimed is:

1. A dual mode device for generating a cross product or a dot product from a first vector and a second vector, the first vector having a first set of components and the second vector having a second set of components, the device comprising:

a dual mode controller receiving the first and second vectors, the dual mode controller being configured to select vector components for evaluating a cross product component or a dot product in response to a first signal, the first signal indicting whether to generate a cross product component or a dot product, wherein the dual mode controller changes the sign of one or more selected vector components when the first signal indicates generation of the cross product component; and a dual mode unit coupled to receive the selected vector components for generating the gross product component or the dot product in response to the first signal and comprising a plurality of shared logic units that are used to generate the cross product component and the dot product.

2. The dual mode device as recited in claim 1, wherein the dual mode unit outputs the cross product component when the first signal indicates generation of the cross product component and wherein the dual mode unit outputs the dot product when the first signal indicates generation of the dot product.

3. The dual mode device as recited in claim 1, wherein the dual mode controller receives a second signal for indicating the cross product component to be generated and selects the vector components for evaluating the cross product component in response to the second signal.

4. The dual mode device as recited in claim 1, wherein the dual mode controller selects the vector components that are different from the cross product component to be generated when the first signal indicates generation of the cross product component.

5. The dual mode device as recited in claim 1, wherein the first set of components includes Ax, Ay, and Az and the second set of components includes Bx, By, and Bz, and wherein the dual mode controller selects all components of the first and second sets when the first signal indicates generation of the dot product.

6. The dual mode device as recited in claim 1, wherein the dual mode unit includes a plurality of multipliers and adders that are arranged to generate the cross product component or the dot product.

7. The dual mode device as recited in claim 6, wherein the dual mode unit uses at least one multiplier and at least one adder to generate the cross product component or the dot product.

8. The dual mode device as recited in claim 1, wherein the dual mode controller is configured to select the vector components for evaluating the cross product when the first signal indicates generation of the cross product, wherein the dual mode unit includes a plurality of sub-dual mode units for generating a plurality of cross product vector components, each sub-dual mode unit generating one cross product vector component such that the dual mode unit generates a cross product of the first and second vectors.

9. The dual mode device as recited in claim 1, wherein the dual mode unit is used in a lighting subsystem that is configured to generate diffuse light, specular light, or spotlight values.

10. The dual mode device for generating a cross product or a dot product from a first vector and a second vector, the first and second vectors having a plurality of components, the device comprising:

a dual mode controller receiving the first and second vectors, the dual mode controller being configured to select vector components for evaluating a cross product or a dot product in response to a first signal, the first signal indicating whether to generate a cross product or a dot product, wherein the dual mode controller changes the sign of one or more selected vector components when the first signal indicates generation of the cross product component; and a plurality of dual mode units coupled to receive the selected vector components for generating the cross product or the doc product in response to the first signal, each dual mode unit generating one cross product vector component of the cross product, the dual mode units generating and outputting the cross product vector components as the cross product when the select signal indicates generation of the cross product component, each dual mode unit comprising a plurality of shared logic units that are used to generate the associated cross product component and the dot product.

11. The dual mode device as recited in claim 10, wherein the first vector includes components Ax, Ay, and Az and the second includes components Bx, By, and Bz such that the dual mode units generate the cross product by producing cross product components Cx, Cy, and Cz.

12. The dual mode device as recited in claim 11, wherein one of the dual mode units is selected to generate the dot product of the first and second vectors when the first signal indicates generation of the dot product.

13. The dual mode device as recited in claim 10, wherein the dual mode units are used in a lighting subsystem that is configured to generate a diffuse light value, a specular light value, and a spotlight value.

14. The dual mode device as recited in claim 10, wherein each of the dual mode units includes a plurality of multipliers and adders that are arranged to generate the associated cross product component or the dot product.

15. The dual mode device as recited in claim 14, wherein the dual mode unit uses at least one multiplier and at least one adder to generate the cross product component or the dot product.

16. In computer system having a graphics subsystem comprising a dual mode device, the dual mode device comprising a dual mode controller and a dual mode unit, a method for generating a cross product or a dot product from a first vector and a second vector, the first vector having a first set of components and the second vector having a second set of components, the method comprising:

receiving the first and second vectors for generating a cross product component or a dot product at the dual mode controller;

receiving the first signal indicating whether to generate a cross product component or a dot product at the dual mode controller;

selecting vector components for evaluating the cross product component or the dot product in response to the first signal;

changing the sign of one or more selected vector components when the first signal indicates generation of the cross product component;

sending the selected vector components to the dual mode unit; and in response to the first signal and the selected vector components, generating the cross product component when the first signal indicates generation of the dot product, wherein the generating of the cross product component and the dot product is performed using a plurality of shared logic units.

17. The method as recited in claim 16, wherein a plurality of cross product vector components comprising a cross product vector are generated in parallel.

* * * * *